(12) United States Patent
Heinze et al.

(10) Patent No.: US 11,046,326 B2
(45) Date of Patent: Jun. 29, 2021

(54) METHOD, APPARATUS, AND PROCESSING DEVICE FOR CONTROLLING FUNCTIONS IN A VEHICLE

(71) Applicant: VOLKSWAGEN AKTIENGESELLSCHAFT, Wolfsburg (DE)

(72) Inventors: Theodor Heinze, Berlin (DE); Thomas Benscheid, Berlin (DE); Jochen Adamek, Berlin (DE); Jens Fliegner, Wahrenholz (DE)

(73) Assignee: Volkswagen Aktiengesellschaft

( * ) Notice: Subject to any disclaimer, the term of this patent is extended or adjusted under 35 U.S.C. 154(b) by 202 days.

(21) Appl. No.: 15/775,018

(22) PCT Filed: Oct. 25, 2016

(86) PCT No.: PCT/EP2016/075622
§ 371 (c)(1),
(2) Date: May 10, 2018

(87) PCT Pub. No.: WO2017/080811
PCT Pub. Date: May 18, 2017

(65) Prior Publication Data
US 2018/0319405 A1    Nov. 8, 2018

(30) Foreign Application Priority Data

Nov. 12, 2015 (DE) .................... 10 2015 222 307.8
Jan. 20, 2016 (DE) .................... 10 2016 200 759.9

(51) Int. Cl.
*B60W 40/09*    (2012.01)
*B60W 40/06*    (2012.01)
(Continued)

(52) U.S. Cl.
CPC .......... *B60W 40/09* (2013.01); *B60W 30/143* (2013.01); *B60W 40/06* (2013.01);
(Continued)

(58) Field of Classification Search
CPC .... B60W 30/143; B60W 40/06; B60W 40/09; B60W 2050/0077; B60W 2050/0088;
(Continued)

(56) References Cited

U.S. PATENT DOCUMENTS 9,165,477 B2 * 10/2015 Wilson .................... G07C 5/008
9,881,498 B2 *  1/2018 Paromtchik ............ G08G 1/052
(Continued)

FOREIGN PATENT DOCUMENTS

AT    507033 A1    1/2010
DE   19938261 A1    2/2001
(Continued)

OTHER PUBLICATIONS

Search Report for German Patent Application No. 10 2016 200 759.9; dated Oct. 27, 2016.
(Continued)

*Primary Examiner* — Anthony R Jimenez
(74) *Attorney, Agent, or Firm* — Barnes & Thornburg LLP

(57) ABSTRACT

A method for controlling functions in a transportation vehicle wherein a driving behavior of a driver is determined. To be able to classify the driving behavior of the driver, a driving behavior of other drivers is also provided. The driving behavior of the one driver is evaluated based on the driving behavior of the other drivers for at least one specific driving situation, and functions in the transportation vehicle are actuated based on the evaluation thereby achieving a comfortable adjustment of the functions for the driver.

13 Claims, 9 Drawing Sheets

(51) Int. Cl.
   *B60W 30/14* (2006.01)
   *B60W 50/00* (2006.01)
(52) U.S. Cl.
   CPC ............... *B60W 2050/0077* (2013.01); *B60W 2050/0088* (2013.01); *B60W 2050/0089* (2013.01); *B60W 2540/30* (2013.01); *B60W 2552/00* (2020.02); *B60W 2554/00* (2020.02); *B60W 2555/20* (2020.02); *B60W 2556/45* (2020.02); *B60W 2556/50* (2020.02); *B60W 2556/65* (2020.02); *B60W 2720/10* (2013.01); *B60W 2756/10* (2020.02)
(58) Field of Classification Search
   CPC ..... B60W 2050/0089; B60W 2540/30; B60W 2540/255; B60W 2540/12; B60W 2540/14; B60W 2540/20; B60W 2540/40; B60W 2540/402; B60W 2540/408; B60W 2720/10; B60W 2750/40; B60W 2550/00; B60W 2550/10; B60W 2550/14; B60W 2550/20; B60W 2550/30; B60W 2550/302; B60W 2550/304; B60W 2550/306; B60W 2550/308; B60W 2550/40; B60W 2550/402; B60W 2550/406; B60W 2550/408; B60W 2520/00; B60W 2520/04; B60W 2520/10; B60W 2520/12; B60W 2050/0001; B60W 2050/0002; B60W 2050/0014; B60W 2050/0093; B60W 2050/0098; B60W 30/02; B60W 30/08; B60W 30/09; B60W 30/095; B60W 30/0956; B60W 30/10; B60W 30/12; B60W 30/14; B60W 30/16165; B60W 30/17; B60W 30/18; B60W 30/18018; B60W 50/00; B60L 11/1862
   USPC ..................................................... 701/93, 24
   See application file for complete search history.

(56) References Cited

U.S. PATENT DOCUMENTS

| | | | |
|---|---|---|---|
| 10,029,696 B1* | 7/2018 | Ferguson | B60W 40/09 |
| 2012/0158276 A1 | 6/2012 | Kim et al. | |
| 2013/0302756 A1 | 11/2013 | Takeuchi et al. | |
| 2015/0039348 A1* | 2/2015 | Miller | G06Q 40/08 705/4 |
| 2015/0166072 A1 | 6/2015 | Powers et al. | |
| 2015/0191178 A1* | 7/2015 | Roy | H04W 4/027 701/36 |
| 2015/0266455 A1 | 9/2015 | Wilson | |
| 2017/0032673 A1* | 2/2017 | Scofield | A61B 5/4845 |

FOREIGN PATENT DOCUMENTS

| | | | |
|---|---|---|---|
| DE | 69823462 T2 | 4/2005 | |
| DE | 102009018742 A1 | 10/2009 | |
| DE | 102009028070 A1 | 2/2011 | |
| DE | 102009039774 A1 | 3/2011 | |
| DE | 102011078946 A1 | 1/2013 | |
| DE | 102011082375 A1 | 3/2013 | |
| DE | 102011116245 A1 | 4/2013 | |
| DE | 102014000843 A1 | 8/2014 | |
| DE | 102013208521 A1 | 11/2014 | |
| DE | 102013211696 A1 | 12/2014 | |
| DE | 102013220453 A1 | 4/2015 | |
| DE | 102014118256 A1 | 6/2015 | |
| EP | 1489576 A1 | 12/2004 | |
| EP | 2778007 A1 | 9/2014 | |
| WO | WO-2013056767 A1 * | 4/2013 | ............ G01C 21/32 |
| WO | 2013158083 A1 | 10/2013 | |

OTHER PUBLICATIONS

Search Report for International Patent Application No. PCT/EP2016/075622; dated Jan. 24, 2017.

Office Action for German Patent Application No. 10 2016 200 759.9; dated May 3, 2018.

* cited by examiner

FIG. 7a — Route section: bend on highway

Bend_on_highway = 46 %

"Ring road" section 020
Histogram VØ

45%

Regulate ACC
down to 70 km/h

"Forest road" section 030
Histogram VØ = 70 km/h

An (exponentially) smoothed average (dashed line) filters two outliers but can also respond to developing trends.

METHOD, APPARATUS, AND PROCESSING DEVICE FOR CONTROLLING FUNCTIONS IN A VEHICLE

PRIORITY CLAIM

This patent application is a U.S. National Phase of International Patent Application No. PCT/EP2016/075622, filed 25 Oct. 2016, which claims priority to German Patent Application Nos. 10 2015 222 307.8, filed 12 Nov. 2015, and 10 2016 200 759.9, filed 20 Jan. 2016, the disclosures of which are incorporated herein by reference in their entireties.

SUMMARY

Illustrative embodiments relate to a method, an apparatus, and a processing device for controlling functions in a transportation vehicle.

BRIEF DESCRIPTION OF THE DRAWINGS

Disclosed embodiments are described in detail hereinafter with reference to the appended drawings, which:

FIGS. 7a-7e show various bend profiles of a route according to a disclosed embodiment;

DETAILED DESCRIPTION

Figure 1:
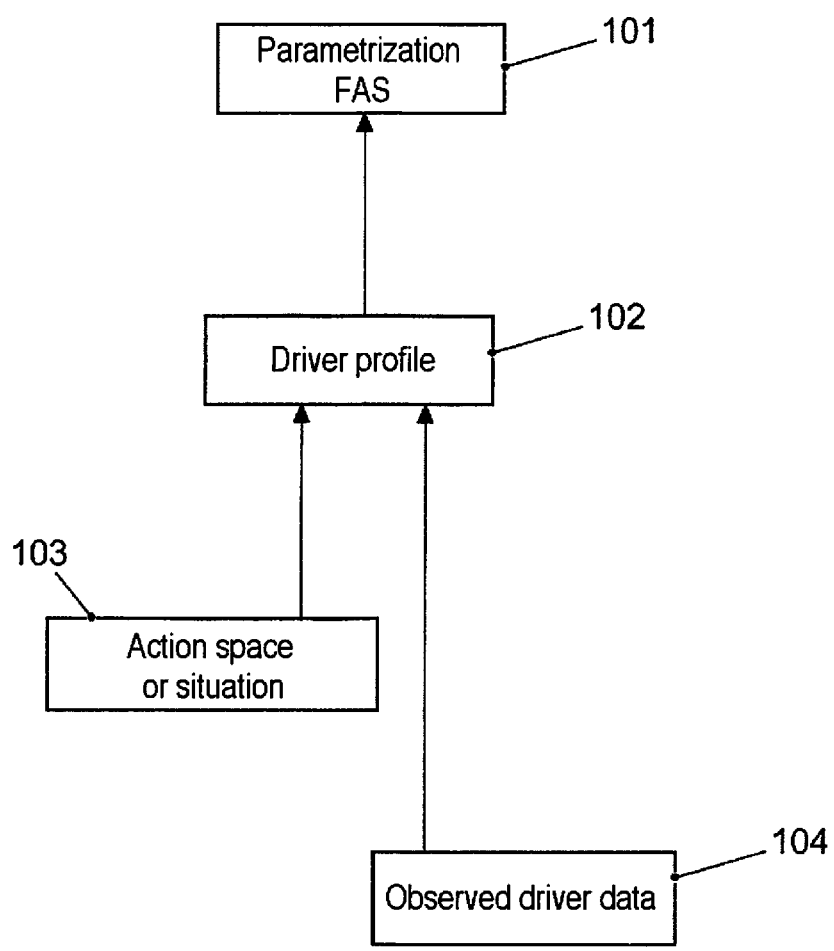
FIG. 1 shows a first embodiment of the disclosed method.

In a transportation vehicle, a plurality of functions can be actuated, which are dependent on a driving behavior of a driver and on external circumstances.

For example, a driver assistance system can be provided in a transportation vehicle, which actuates electronic auxiliary devices in transportation vehicles to assist the driver in certain driving situations.

The control of these auxiliary devices by the driver assistance system can be based on the driving situation. The driving situation can, for example, comprise weather conditions, road condition or obstacles such as roadworks on a route and accordingly a route to be covered can be different for different route sections.

To obtain information relating to the driving situation, inter alia knowledge relating to the condition of the route is therefore necessary. For example, a transportation vehicle which travels through a certain section of the route can determine to this end whether, for example, obstacles are located on the route or can determine by transportation vehicle sensors which current weather conditions are prevailing.

If this is executed over a multiplicity of transportation vehicles, that is over an entire transportation vehicle fleet and for a plurality of route sections, a map can be created, for example, which comprises information from a plurality of routes.

Precise maps of routes are very important for the precise control of driver assistance systems since they provide information about the exact roadway behavior. Based on such map material, driver assistance systems can be actuated depending on the situation.

A corresponding method is described in the document DE 10 2013 208 521 A1. This method is used for collective learning of a road model, in particular, a digital map, with a transportation vehicle fleet and for providing a road model produced according to the method.

The method disclosed in this document is also used for supplementing a road model. Furthermore, a method for updating a road model, a method and an apparatus for self-localization of a transportation vehicle based on a road model and a method for georeferencing features based on a road model according to the above document is provided.

A multiplicity of transportation vehicle trajectory and perception data are recorded in this case. Associations between the trajectories are created by forming feature grids and probability field feature grids for corresponding trajectory points to be associated and correlating these to form association hypotheses.

Based on the associations and on the basis of odometry and position recordings, an information graph is formed and the relevant optimization problem for estimating optimal trajectory points is solved.

The recorded perception data are evaluated, aggregated and merged on the basis of the estimated trajectory points to create a highly accurate road model.

DE 10 2011 116 245 A1 discloses a method for determining current route information of a digital map, which information describes at least one route section to be traveled.

Sensor data are recorded by a multiplicity of motorized transportation vehicles here by at least one sensor of the motorized transportation vehicle during travel, which are evaluated inside the motorized transportation vehicles to give individual route information assigned to route sections.

The sensor data are evaluated inside the motorized transportation vehicles to give individual route information assigned to route sections and transmitted at least partially wirelessly to a central data processing device.

The data processing device selects, route information to be incorporated in the digital map and/or to be replaced in the digital map by making plausible corresponding individual route information of different motorized transportation vehicles with respect to one another and updates the digital map.

The documents therefore disclose a creation of road maps and a transmission of sensor data to a data processing unit also by data from various motorized transportation vehicles which can then be used in transportation s.

For driver assistance systems and also for other functions, it would be beneficial to use further information relating to route sections to enable a better control of the functions.

Disclosed embodiments provide a method, an apparatus, and a processing device.

The disclosed method for controlling functions in a transportation vehicle comprises determining a driving behavior of a driver and providing a driving behavior of a plurality of further drivers.

The driving behavior of a driver here generally comprises the behavior of the driver in road traffic, i.e., describes parameters such as a speed, an acceleration or a slowing down which can be influenced by the driver (in contrast, for example, to a road condition as in one of the models mentioned initially, which cannot be influenced by the driver). For example, the driving behavior describes the speed at which the transportation vehicle with the driver travels on certain route sections or the speed at which the transportation vehicle with the driver travels around bends. The driving behavior can, for example, also comprise the behavior of the driver during overtaking maneuvers or whether the driving style of the driver is rather passive or active.

The method comprises an evaluation of the driving behavior of the one driver based on the driving behavior of the plurality of other drivers for at least one specific driving situation and an actuation of functions in the transportation vehicle based on the evaluation.

In contrast to the prior art, when actuating the functions therefore a behavior of other drivers, e.g., their speed, is also taken into account.

Here this method takes into account current driving data for various driving situations. In this case, for example, the driving behavior of a driver, such as, for example, the speed of the driver, is taken into account and/or situation-specific driving data such as, for example, weather conditions or briefly appearing obstacles.

Specific functions in a transportation vehicle controlled by the driver can be actuated in an optimized manner by evaluating specifically this driving data, and by the classification of the driving behavior of a driver into the spectrum of a plurality of drivers. For example, functions which are controlled by a driver assistance system and/or an adaptive speed regulation can be optimized in such a manner that these can be actuated accordingly depending on the situation and in an always up-to-date manner.

According to at least one disclosed embodiment, the method can further comprise transmitting first information relating to the driving behavior of the one driver to an external processing device and/or to at least one further transportation vehicle.

The provision of the driving behavior of the plurality of other drivers can further comprise receiving second information relating to the driving behavior of the plurality of other drivers from the external processing device and/or from at least one transportation vehicle which is located in the vicinity.

The external processing device can, for example, be an external server device on which various computer-supported applications can run. The external server device can communicate with a transportation vehicle computer via commonly used hardware such as, for example, via a navigation device. Communication via a wireless internet connection or via another suitable communication unit (e.g., with an OCU, "onboard communication unit") is also possible. In this case, the communication with the external processing device can take place continuously.

The external processing device can also be connected directly via an adapter, for example, a serial bus system such as a Controller Area Network (CAN) to the transportation vehicle computer when the transportation vehicle is at rest, e.g., during servicing. This can be used during a test phase for prototypes. In this case, communication with the external processing device takes place only infrequently.

Corresponding hardware or software therefore does not have to be additionally implemented for this type of communication.

As a result of this communication, the external processing device can provide information relating to the driving behavior of many drivers in a continuously up-to-date manner to a plurality of transportation vehicles.

The transmission of the information can also take place in real time so that information relating to a route can already be provided before the transportation vehicle has reached the corresponding route.

According to at least one disclosed embodiment, the determination of the driving behavior of a driver and/or a plurality of drivers can be made for sections of a route.

With the disclosed method, functions in the transportation vehicle which are specifically relevant for this section of the route can thus be actuated independently, such as, for example, a reduction in the speed when the transportation vehicle enters a bend.

Based on the driving data of an already traveled section of the route which have been determined by a transportation vehicle which has already traveled through this section of the route, functions of a transportation vehicle which travels through this section of the route at a later point in time can be actuated.

According to at least one disclosed embodiment, third information can be provided which relates to the route and which can be linked to the first or second information.

The third information can comprise information which is independent of the driving behavior of the driver, e.g., weather conditions during the driving behavior of the first and/or second information and/or a date indication or a time indication, which can specify when the transportation vehicle is and/or has been on the transportation vehicle route during the driving behavior of the first and/or second information. The actuation of the functions can then additionally take place based on the third information. Thus, in addition to the driving behavior, further criteria can be included.

Based on the third information an instantaneous driving behavior of the driver can be better evaluated. For example, the driving behavior depends on external circumstances such as weather conditions or also the time of day (in particular, daytime or nighttime) or the season. If, for example, the driving behavior of the driver has a significantly slower speed than the driving behavior of the further drivers, this can be because the driver simply drives more slowly than most other drivers. However it can also be because the weather conditions have changed, for example, there is now snow cover, or the conditions on a section which has just been traveled through have otherwise changed. For example, an obstacle such as roadworks can be located on the road which can also influence the speed.

Finally, the speed can also depend on other transportation vehicles, for example, if the transportation vehicle of the driver is located behind another transportation vehicle that is moving at a reduced speed or if there is a queue. These factors can be taken into account in the analysis at least partially with the aid of the third information.

The speed can, for example, then be different if the transportation vehicle travels through the same section of the route and now an obstacle is located on the road, such as, for example, roadworks.

The third information can be provided in this case to a plurality of transportation vehicles by the external processing device.

According to at least one disclosed embodiment, the driving behavior of the plurality of other drivers and/or the third information can be evaluated within a predefined time interval and/or within a predefined time window.

Thus, for much-traveled sections of a route prompt information and for less-traveled sections of the route temporally coherent information can be processed from the collected information.

Prompt information comprises information which was determined within a specific time interval before the evaluation, for example, half an hour or an hour, e.g., before the transportation vehicle of the driver is located on a respective section of the route.

In the case of temporally coherent driving data, information from similar time windows, e.g., similar days such as, for example, weekdays, times of day, months etc. is evaluated.

For example, the driving behavior of the driver who travels through a section of the route at a specific time can be compared with the driving behavior of other drivers who have traveled through this section of the route in a selected time window, which includes the point in time.

For the purpose of the evaluation, it is additionally possible to compare the driving behavior of the other drivers at a specific time, for example, under comparable weather conditions, with the driving behavior of the driver.

According to at least one disclosed embodiment, the evaluation can further comprise comparing the driving behavior of the driver with the driving behavior of the plurality of other drivers during a first travel through a section of the route.

The method can also further comprise creating a driver-specific profile based on the comparison. This can be stored and then used for actuation of transportation vehicle functions.

Thus, an automatic actuation of functions in real time is made possible, wherein the driver-specific profile which was created during traveling-through for the first time can be used for any further travel without a new profile necessarily needing to be determined. Driving data can in this case be stored in the driver-specific profile.

A comparison of the driving behavior can result in an optimized actuation of functions in the transportation vehicle since the driving behavior is not restricted to one transportation vehicle but is additionally based on the driving behavior of the plurality of other drivers.

In at least one disclosed embodiment, the actuation of functions comprises a parametrization of a driver assistance system. Such a parametrization of a driver assistance system based on the evaluation, e.g., comparison, can result in safe and more comfortable driving as well as increased confidence of the driver in the transportation vehicle.

During the parameterization of the driver assistance system, parameters such as the speed of the transportation vehicle or the distance of the transportation vehicle from another transportation vehicle, from an obstacle or from a specific section of a route are adapted. The driver assistance system can then be set with these parameters.

This setting is no longer made by a driver of the transportation vehicle himself but is controlled automatically, which affords high comfort for the driver.

According to at least one disclosed embodiment, the method further comprises recording how far the driver-specific profile changes during each further travel through the section of the route.

The functions can be actuated during each further renewed travel through the section of the route depending on the recording as to how far the driver-specific profile changes.

According to at least one disclosed embodiment, the method can further comprise estimating how far the driver-specific profile changes for a further not yet traveled section of the route depending on a statistical model.

Using the statistical model, for example, by a linear regression, an average speed for a not yet traveled section of the route can be calculated based on an average speed for an already traveled section of the route. On the basis of this estimate, for example, parameters, for example, for the driver assistance system, can be adapted and the actuation of functions of the driver assistance system can be optimized.

According to at least one disclosed embodiment, the statistical model can be based on the driver-specific profile of an already traveled section of the route.

From the data of the driver-specific profile, prompt and/or temporally coherent driving data can thus be compared in a pairwise manner for already traveled sections of a route and sections still to be traveled and statistical models can be learnt. Thus, a driving behavior of a still untraveled section of the route can be concluded from the data (in particular, driving behavior) on the traveled section of the route.

According to at least one disclosed embodiment, an apparatus for controlling functions in a transportation vehicle comprises a control device by which a driving behavior of a driver can be determined.

The control device then evaluates the driving behavior of the one driver based on the driving behavior of a plurality of other drivers for at least one specific driving situation.

The control device further actuates functions in the transportation vehicle based on the evaluation.

The benefits of the disclosed apparatus substantially correspond to the above-mentioned benefits of the disclosed method for controlling functions in a transportation vehicle. The apparatus can be used to implement one of the above-described methods.

According to at least one disclosed embodiment, the control device can comprise a driver assistance system and/or an adaptive speed regulation.

An adaptive cruise control, ACC, can, for example, normally only set a constant speed. By the disclosed apparatus, the ACC can continuously adapt the speed for specific sections of a route and regulate the speed according to the driver and the current driving situation. The same applies for the actuation of functions of a driver assistance system.

According to at least one disclosed embodiment, the control device can transmit first information relating to the driving behavior of the one driver to an external processing device.

The control device can also receive second information relating to the driving behavior of a plurality of other drivers from an external processing device.

The control device has the same benefits as the method that can be carried out by this control device and which have already been discussed previously.

In addition, a processing device is provided having a wireless receiver for collecting and receiving first information relating to the driving behavior of a driver from a transportation vehicle and/or a plurality of transportation vehicles.

The processing device further has a wireless transmitter for transmitting second information relating to the driving behavior of a plurality of drivers to a transportation vehicle and/or a plurality of transportation vehicles. This processing device can serve as an external processing device as described above.

According to at least one disclosed embodiment, the external processing device can be a single external server which can be connected by an adapter to the control device or can communicate in a wireless manner with the control device.

Driver-specific and section-specific information can be read out from the external server via an adapter, for example, a CAN (Controller Area Network) adapter which can be installed on the control device, which, for example, can be a transportation vehicle computer.

The transportation vehicle computer can thus be connected to the external server by a serial bus system.

The connection as well as the transmission of the information take place by commonly used hardware and are based on already existing communication methods. Therefore no additional components or methods are required to implement the disclosed apparatus.

The processing device can also be a computer network which can communicate in a wireless manner with the control device.

Necessary applications for creating and processing the information when using the individual external server are the same as when using the computer network so that the applications can easily be transferred from a server to a plurality of computers or servers.

The external processing device can be a customary central computer network with back-end and online connection and can communicate continuously with an entire transportation vehicle fleet.

A disclosed system comprises a control device as described above and a processing device as described above.

A calculation of parameters for actuation of the functions can take place in the system in the control device which is integrated in the transportation vehicle itself or even in the processing device.

The adaptation of functions based on the above system offers benefits in terms of comfort and acceptance. An adaptation is made with the aid of information relating to immediately preceding transportation vehicles or relating to the relationship of one's own driving behavior to the driving behavior of other drivers.

The system can be implemented with the aid of all transportation vehicles which, for example, have a driver assistance system or an ACC and a navigation system.

Disclosed embodiments are explained in detail hereinafter with reference to the appended drawings. These disclosed embodiments are merely examples and are not to be interpreted as restrictive. While, for example, the embodiments are described in such a manner that they cover a plurality of features and elements, some of these features can be omitted in other embodiments and/or replaced by alternative features or elements. In other embodiments, additional or alternatively additional features or elements can be provided in addition to those described explicitly. Modifications which relate to one or more embodiments can also be applied to other exemplary embodiments unless anything different is specified.

FIG. 1 shows a method for a transportation vehicle according to a disclosed embodiment in which in 101 a driver assistance system (FAS) is parametrized according to a safety and comfort perception of a driver of the transportation vehicle.

As already mentioned at the outset, driver assistance systems are electronic auxiliary devices in transportation vehicles to assist the driver in specific driving situations. This system intervenes partially independently or in a self-regulating manner in the drive, control (e.g., accelerator, brake) or signalling devices of the transportation vehicle. By suitable interfaces, e.g., displays and/or acoustic signal generators, the driver can be warned by the driver assistance system shortly before or during critical driving situations.

Parametrization means here that parameters which influence or determine the functions of the driver assistance system are set. For example, speed of the transportation vehicle and the distance of the transportation vehicle from a preceding transportation vehicle, from an obstacle on a section of the route or from a specific section of a route can vary and on the basis of these variables, the driver assistance system can be parametrized, i.e., set.

In the method of FIG. 1 a driver profile 102 is required here, information from which is used to perform the parameterization of the driver assistance system at 101.

The driver profile 102 comprises, for example, the average speed of the transportation vehicle and an average distance from a preceding transportation vehicle, which therefore corresponds to an average driving behavior of the driver. The driver profile 102 can also comprise further information relating to the driving behavior of the driver. To be able to determine the driver profile 102 from the driving behavior of a driver, in the exemplary embodiment of FIG. 1 this is set in a context to a driving situation 103. A certain action space for the driver and/or for an automatic driving regulation can then be obtained from the driving situation.

For example, knowledge relating to the average speed is possibly not sufficient to adapt functions of a driver assistance system since these can vary continuously based on the driving behavior of the driver and/or depending on the specific driving situation in each case. The speed must, for example, be reduced under circumstances when the roadway is wet.

Such a specific driving situation exists, for example, when a transportation vehicle travels through a road section at a specific speed and the road, for example, has a specific gradient or a specific bend position.

The more information is available on the respective specific driving situation, the more accurately the assessment of the driver can be made by the measured data. In this case, observable driving data 104 are evaluated for an assessment of the driver.

For example, such observable driving data 104 can comprise information relating to the condition of the road, such as, for example, smoothness of the road and wetness of the road, which were determined by transportation vehicle sensors and can provide information as to the driving situation in which a transportation vehicle is found when it travels through a specific section of a route. Information relating to the bend position of the specific section of the route also constitutes examples for observable driving data.

Furthermore, the observable driving data, for example, comprise information as to whether the transportation vehicle is traveling behind another transportation vehicle. As a result, the speed of the transportation vehicle can be different, i.e., for example, lower than if the transportation vehicle is not located behind another transportation vehicle and travels through a respective section of the route.

In addition, the observable driving data comprise a driving behavior of other drivers of other transportation vehicles, which, for example, can be provided via a server or a similar device. The driving behavior of the driver, such as is present, for example, in the driver profile 102, can then be set for evaluation in the context of the driving behavior of other drivers. This will be explained in detail hereinafter. Thus, the method of FIG. 1 can generally be used for controlling functions in a transportation vehicle and, in particular, for controlling a driver assistance system at 102 and/or an adaptive speed control. The method of FIG. 1 can be executed, for example, by a control device installed in the transportation vehicle.

The use of the driving behavior of the driver, e.g., in the driver profile 102, as well as the behavior of other drivers will now be explained in detail with reference to FIG. 2.

Figure 2:
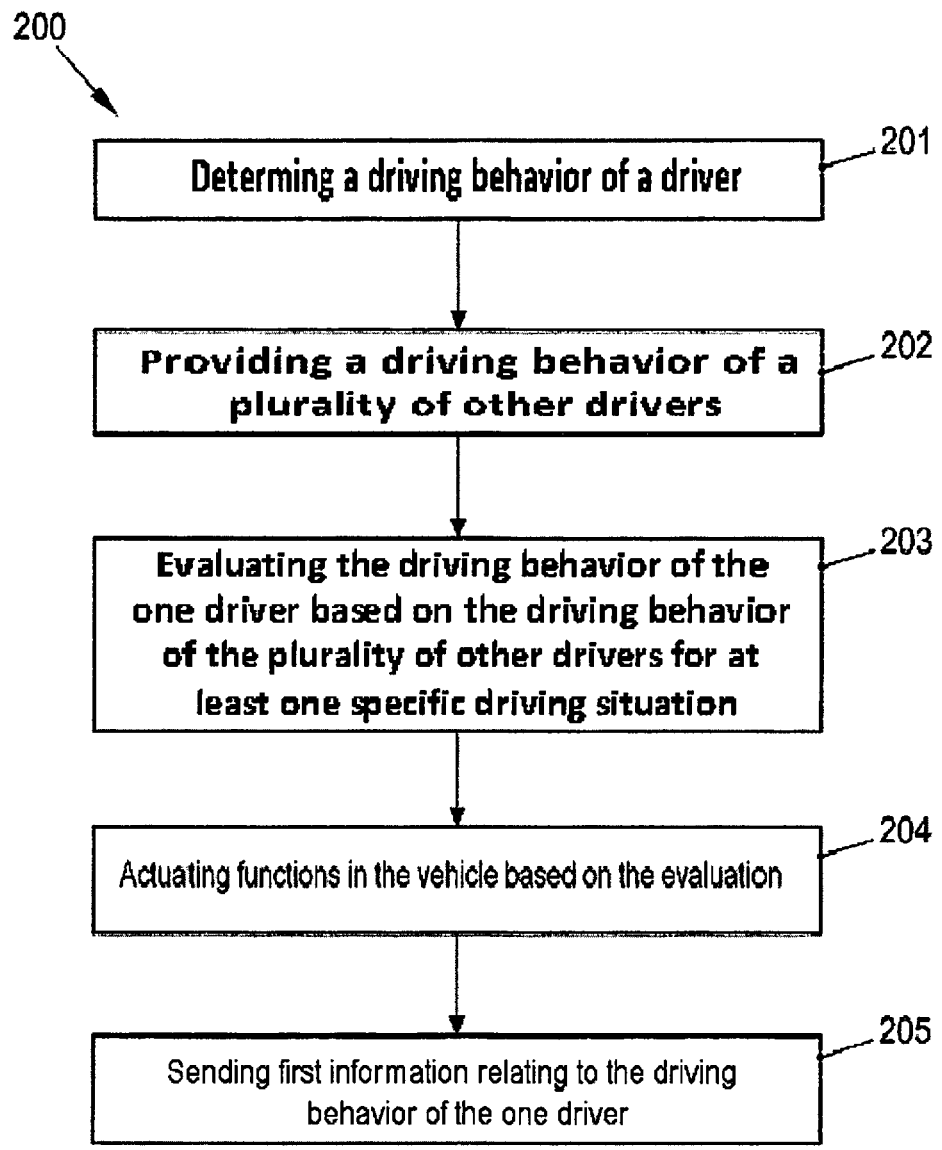
FIG. 2 shows a further embodiment of the disclosed method.

FIG. 2 shows process operations at 201 to 205 of a method 200 which can be executed, for example, by a control device of a transportation vehicle, e.g., an Electronic Control Unit ECU, but is not restricted to this.

For the recording of data which are required in the disclosed embodiment of FIG. 2 for the actuation of a driver assistance system or another transportation vehicle function, driver-specific and section-specific information is initially collected and then evaluated.

In operation at 201 of the method 200 of FIG. 2, a determination of a driving behavior of a driver takes place.

The driving behavior of the driver comprises in this case driver-specific information, for example, information as to the speed at which a driver travels on a route or the distance of the transportation vehicle from another transportation vehicle or from an obstacle on the route.

The speed can be recorded by speed sensors installed in the transportation vehicle, the distance via distance sensors. A transportation vehicle computer reads out by suitable interfaces the values of the speed sensors and/or the distance sensors and stores the same.

In an operation at 202 of the method 200 of FIG. 2, the driving behavior of a plurality of other drivers is then provided, e.g., provided by an external device.

For collecting this type of data relating to the driving behavior of a plurality of other drivers, for example, in each individual transportation vehicle, a plurality of transportation vehicles, e.g., a transportation vehicle fleet, the values for the speed and the distance, as described above, are determined and stored. Via an interface attached at the transportation vehicle computer, for example, via a CAN adapter, the transportation vehicle computer can be connected to another external computer or server and transmit these values to the external computer, e.g., during servicing in a workshop. If this takes place in a plurality of transportation vehicles, many data sets can be collected and stored on the external computer.

Conversely, the plurality of data sets can be transferred from the external computer by the above procedure onto a transportation vehicle computer so that the values for the speed and/or distances of many transportation vehicles, i.e., the driving behavior of many drivers, can be provided to a transportation vehicle. The external computer operates here as a server.

In other disclosed embodiments, the data sets can also be transmitted wirelessly to the external computer or another processing device, for example, by a communication unit installed in the transportation vehicle. This can also be accomplished continuously, for example via a mobile radio network, e.g., by a suitable application ("app").

The data sets can alternatively also be transmitted onto a complete computer network.

The transmission of the data sets from the transportation vehicle computer can then be accomplished, for example, via an Online Connectivity Unit (OCU, also designated as onboard communication unit, i.e., a communication unit installed in the transportation vehicle) which communicates in a wireless manner with an external computer or a computer network.

The transmission of driver-specific data sets to a computer network can take place anonymously. So that such communication can take place between the computer network and an individual transportation vehicle, a corresponding security key can be exchanged between the transportation vehicle computer and the computer network. Other transportation vehicles then have no access to the corresponding data.

To provide information relating to the driving behavior of the plurality of drivers, corresponding information (hereinafter designated as second information) is therefore received by an external processing device. This external processing device can, for example, be the above-described external computer or a complete computer network.

In operation at 203 of the method 200 of FIG. 2, an evaluation of the driving behavior of the driver is then made based on the driving behavior of the plurality of other drivers for at least one specific driving situation.

The data sets can be prepared on the external computer, for example, via applications which run on the external computer. These applications can, for example, be "open source" applications. For example, average values can be formed from many data sets, which are then provided to individual transportation vehicles.

The administration of the data sets can be accomplished, for example, by a database, e.g., via "HBase" which is a commonly used, scalable and simple database for administering very large amounts of data. This database can be located on the external computer.

In this case, for example, it is evaluated how a driver has behaved in a specific driving situation and thereby compared with how other drivers have behaved in the same driving situation. For example, it can be evaluated how fast a driver has passed a specific route section of a road, for example, a bend.

This speed is then compared with other speeds provided by other transportation vehicles which have previously passed this bend.

Based on the comparison and the evaluation of the corresponding information, in operation at 204 of the method 200 of FIG. 2, functions in the transportation vehicle are actuated. These functions can, for example, be the driver assistance system already discussed above.

If, for example, for the already-mentioned bend, a specific speed for a driver of a transportation vehicle has been determined and compared with other speeds of other drivers, the driver assistance system can be optimized in such a manner that, for example, when passing the bend again, the transportation vehicle has an improved bend position or that the transportation vehicle is held on the road without any swerving. In addition, the driving situation can be taken into account such as, for example, the wetness of the road, and the driver assistance system can be additionally actuated depending on this.

In an operation at 205 of the method 200 of FIG. 2, as already mentioned briefly above, first information relating to the driving behavior of the one driver determined in operation at 201 is sent to an external processing device and/or to at least one transportation vehicle located in the vicinity. This makes it possible, for example, to collect data relating to a plurality of drivers, which can then again be provided in operation at 202 when running through the method 200 again, e.g., in another transportation vehicle.

It is also possible that information for specific route sections is provided and exchanged via third party providers, for example, via a navigation device or the like. The first information of the one transportation vehicle can in this case be sent, for example, via a navigation device installed in the transportation vehicle, to the external processing device. A navigation device of another transportation vehicle can then receive the corresponding information as second information from the external processing device and, for example, supply it to a control device installed in the transportation vehicle, which then processes this for further use in the above-described method.

Figure 3:
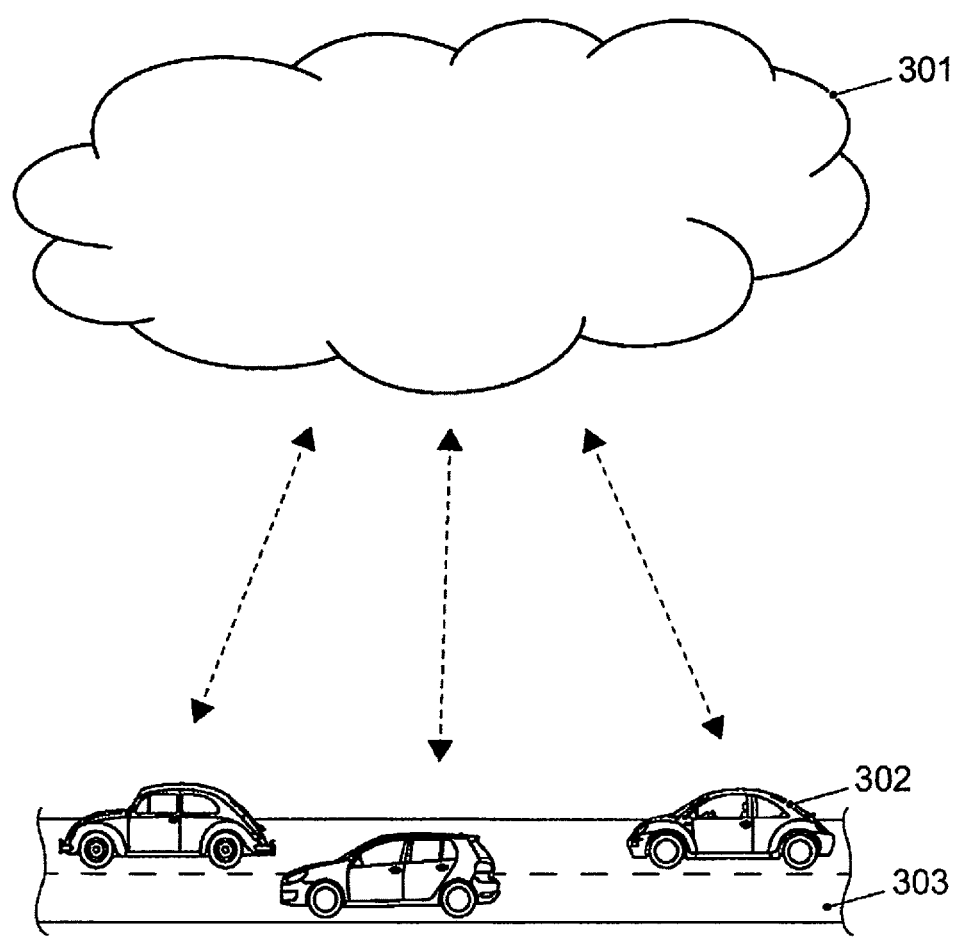
FIG. 3 shows a schematic view of a disclosed embodiment.

The communication of the various transportation vehicles with the external processing device as described above can take place, for example, by the above-mentioned Online Connectivity Unit (OCU), which is shown schematically in FIG. 3.

FIG. 3 shows various transportation vehicles 302 which are moving on a route 303 and send data continuously to a computer network 301 or receive data from the computer network 301, wherein the transmission and receiving is shown by dashed arrows in FIG. 3. The computer network 301 can here be seen as an example for the external processing device.

The computer network is generally a combination of various technical primarily independent electronic systems, e.g., computers or generally servers which enable communication of the individual systems amongst one another.

The data comprise, for example, the above-described first information relating to the driving behavior of a driver of an individual transportation vehicle 302 which is sent to the computer network 301 and in the example shown the second information relating to the driving behavior of the plurality of drivers which is received by the transportation vehicle 302 from the computer network 301.

In the external processing device, e.g., the computer network 301, the first information received by a plurality of transportation vehicles can be processed and analyzed, e.g., to provide it in processed form as second information. This can be accomplished via corresponding applications.

For example, the speed of a plurality of drivers and its distribution for a specific route section can be evaluated. Thus, for example, it can be determined that 90% of the drivers travel at a speed between 60 and 70 km/h through a specific bend k.

The driving behavior of a specific driver determined, for example, in operation at 201 of FIG. 2 can then be related to the driving behavior of the plurality of drivers.

For example, it can thus be determined that the one driver is driving faster through the bend k than 70% of all drivers.

This information can, as already mentioned above, optimize or parametrize a driver assistance system. For example, on the basis of the determination of the driving behavior of the one driver over several bends, for successive bends a speed, an adaptive speed regulation (Adaptive Cruise Control, ACC) of an adaptive cruise control can be set to a value which corresponds to the driving behavior of the driver. In the above numerical example the speed can, for example, be set in such a manner that here a speed faster than about 70% of the plurality of other drivers is also provided for this following bend.

An adaptive cruise control in this case is a speed regulating system which is installed in a transportation vehicle and sets a preferred speed but here includes a regulation of the distance from a preceding transportation vehicle as an additional feedback and control variable.

As options of the above-described communication via an external processing device, the transmission and receiving of the first and second information can take place directly between different transportation vehicles without the first information and/or the second information being sent to the external processing device.

This can be accomplished, for example, via a so-called "Car2Car Communication" in which the linked transportation vehicles locally exchange information relating to driving data of individual route sections during driving.

Additional information relating to sections of a route can also be provided by a so-called "intelligent section". An "intelligent section" permanently records driving data and provides this to the transportation vehicles or the central computer network such as the above-described external processing device.

On an intelligent section, for example, sensors are installed in the ground of a transportation vehicle section which determine the wetness of the road. By transmitters attached to the sensor, values for the wetness can be transmitted to a receiver mounted in the transportation vehicle.

This additional information can also be used when setting transportation vehicle functions. Now even more specific examples are given for special driving situations for the methods and apparatus explained above. In an example which will be explained with reference to FIG. 4 and FIG. 5, near-term data are processed from collected driving data, i.e., the first and second information for much-traveled route sections. For example, a first driver travels in a transportation vehicle, for example, in a transportation vehicle 402 shown in FIG. 4 at a speed at a specific time, e.g., at 15:10 over a section A1 of a route 401. To classify his driving behavior, for comparison driving data of a plurality of other drivers in a time interval from 15:00-15:20 on the same day, i.e., close in time to the travel of the driver, are evaluated. The histogram shown in FIG. 5 shows a distribution of the speed of the transportation vehicle for the first section.

On less traveled sections of the route 401, i.e., when sufficient near-term data of other drivers is not available, temporally coherent data can be used. For example, a second driver travels in a transportation vehicle, for example, in the transportation vehicle 403 shown in FIG. 4, at a speed at an assessment at 13:55 over a section A2 of the route 401. Here driving data of other drivers from other weekdays is now evaluated at this time under, for example, comparable weather conditions.

Figure 4:
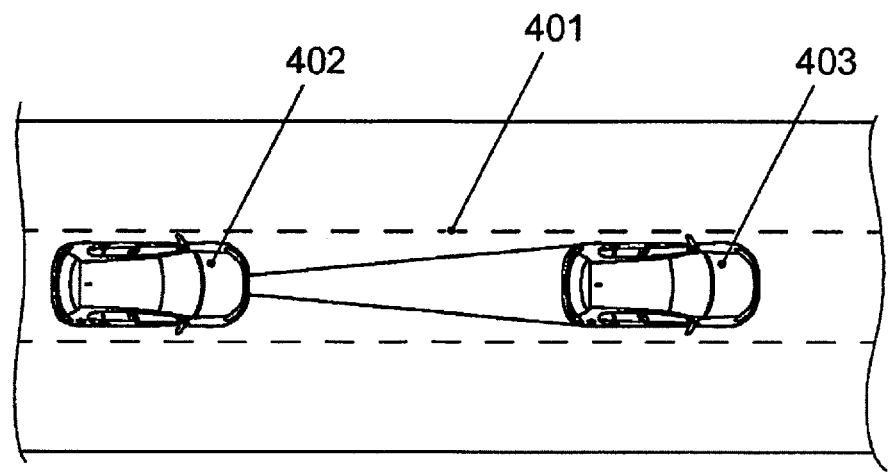
FIG. 4 shows a schematic view of two transportation vehicles moving along a route according to a disclosed embodiment.
Figure 5:
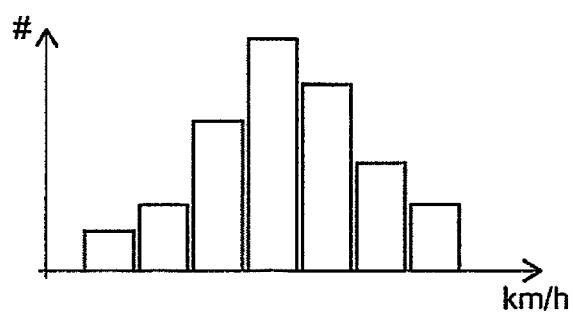
FIG. 5 shows a histogram according to a disclosed embodiment.

During a following journey, for example, when the first transportation vehicle 402 is located behind the second transportation vehicle 403 as shown in FIG. 4, the action space of the driver of the first transportation vehicle 402 is restricted and can accordingly be treated separately in disclosed embodiments. The driving data of the driver recorded during such a journey can falsify the evaluation since here the driving behavior of the driver is forced upon him by the preceding transportation vehicle and therefore does not correspond to a preferred driving behavior. To allow for this, for example, the speed in such a situation can remain disregarded in the method of FIG. 2.

During an adaptation of a driver assistance system such as the above-mentioned speed regulation, that is when the transportation vehicle is already in a specific driving situation, e.g., in the above-described following travel, a speed calculated by the disclosed method is then used, for example, as an upper threshold value. The speed of the transportation vehicle 402 is then determined, for example, by the speed of the transportation vehicle 403 as long as the transportation vehicle 403 travels more slowly than the calculated speed. If the transportation vehicle 403 travels faster, the speed of the transportation vehicle 402 is then regulated, for example, to the calculated speed.

After traveling through a section of a route, driving data of the driver are compared with the driving data of other drivers (temporally or temporally coherently as described above). Corresponding parameters of a driver profile such as, for example, the speed can then be adapted. The driver profile can, for example, comprise information relating to the driving behavior as already discussed above.

The driver profile can comprise the rank of the driver datum (i.e., the data for the respective driver) in the histogram of the comparative data of the plurality of other drivers as percentage information. For example, it can be stored in the driver profile how a speed of the driver should be classified compared to other drivers, e.g., faster than 45% of the plurality of other drivers, faster than 70% of the plurality of other drivers or the like.

The driver profile can be adapted, for example, by controlling a parameter such as the above % values, i.e., the parameter is adapted continuously on the basis of new determined data. This can be accomplished, for example, by the so-called "Exponential Moving Average Principle", i.e., by a moving average value, also designated as moving average. This principle is used generally for smoothing time or data series.

Alternatively or additionally, the driver profile can comprise the ratio of the driver datum to parameters such as, for example, an average value or a standard deviation of the distribution of the data of other drivers.

Hereinafter it is explained further with reference to FIG. 6 how driving data of an already traveled route can be used to make predictions for a route still be to traveled.

Figure 6:
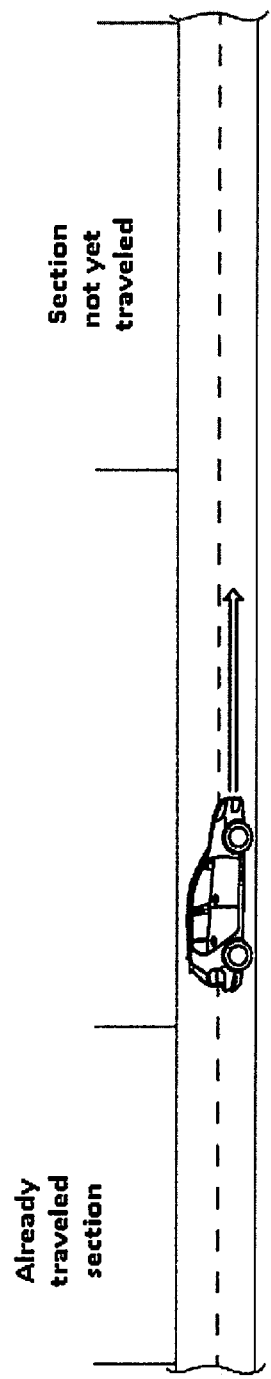
FIG. 6 shows a schematic view of a transportation vehicle on a route according to a further embodiment.
Figure 7B:
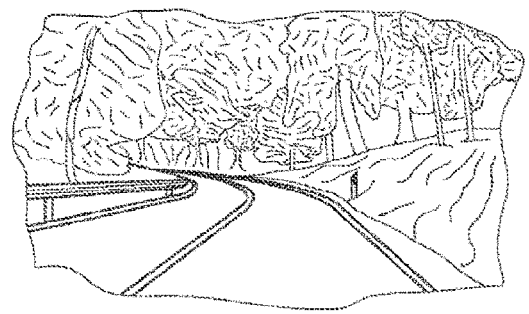
Figure 7B:
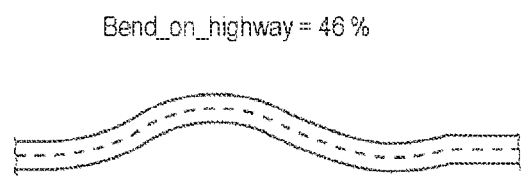
Figure 7C:
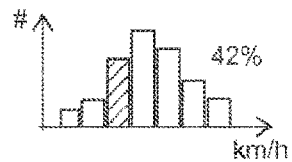
Figure 7D:
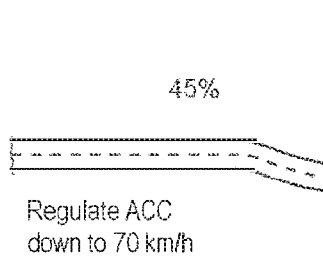
Figure 7E:
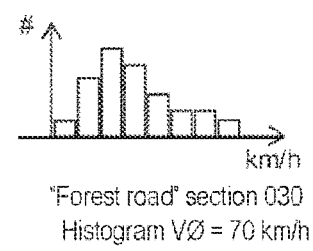

FIG. 6 shows a schematic view of a transportation vehicle on a route in which a transportation vehicle has already traveled a section of a route. From the driving data already mentioned above, which have been collected for this already traveled section (or the driving behavior of the driver and the plurality of other drivers), near-term or temporally coherent driving data are compared in pairs for already traveled sections of the route and sections still to be traveled and, for example, a statistical model is created. This can be accomplished, for example, by machine learning such as, for example, a regression. That is, a learning takes place based on driving data of already traveled sections of the route and can then be applied for sections of the route still to be traveled. This will be explained in detail in the following.

For example, driving data relating to the driving behavior of a plurality of drivers are collected in a first operation over a first section (section 1) of the route, wherein the transportation vehicles move at an average speed for the first section.

In a second operation a statistical model is used to calculate the diagram: VØ (section 1)−>VØ (section 2) for the first section and the second section, wherein VØ is the average speed over the respective section.

On the basis of these data for a plurality of drivers, a relationship can be determined between the average speeds of the plurality of drivers on section 2 and the average speeds of the plurality of drivers on section 1, for example, a linear relationship. A linear regression can be used for this: VØ (section 2)=VØ (section 1)*a−b, where a and b are parameters to be determined.

Example values for average speeds are given in Table 1. The average speeds in Table 1 are assigned to the respective section for a specific driver who is designated with driver ID. For these average speeds is obtained, e.g., a=0.945 and b=16.8. The above-discussed calculation can be performed, for example, by above-discussed applications in a computer network, such as the computer network 301 shown in FIG. 3. A distributed calculation by applications allows the analysis of large amounts of data in real time. A flexible expansion of the computer network is also feasible.

If the average speed for section 1 is now determined for a driver, e.g., in operation at 201 of the method 200, with the aid of the statistical model, e.g., the above-determined relationship, a prediction can consequently be estimated for the average speed for section 2. By this estimated speed, for example, a speed regulation can be set.

In conjunction with FIGS. 7a-7e, as a further example a parametrization of an adaptive cruise control (ACC) and an emergency braking assistant when traveling round a bend on a highway on the basis of a comparison with other drivers on a same section of the route is now explained.

The parametrization of an ACC and an emergency braking, which are explained as examples for driver assistance systems is made according to the principle explained above with reference to FIG. 2, that is the sectionwise comparison of driving data of a driver with the driving data of other drivers.

An emergency braking assistant typically comprises a surroundings monitoring system which identifies critical distance situations by a sensor, for example, a radar and/or laser and helps to reduce the stopping distance of a transportation vehicle. In a danger situation the system warns the driver visually and/or acoustically and/or with a jerk of the brake. The emergency braking system operates here independently of the ACC.

Such a parametrization can be performed with a corresponding computer network which was already discussed above (e.g., 301 in FIG. 3). In this computer network in the present example, data sets for traveled sections of a route comprising the driving data explained above are collected continuously from a plurality of drivers, having the following content: time at which a transportation vehicle passes a specific section of the route, speed, motorization of the respective transportation vehicle kW/kg, type of transportation vehicle (e.g., SUV, sports car etc.), rain/no rain (such as can be determined, for example, by the windscreen wiper), weekday/Sunday, following travel/free travel (which can be determined by an evaluation by a radar). The data can be stored anonymously in the computer network and processed.

A transportation vehicle of a first driver which passes, for example, a bend such as the bend shown in FIGS. 7a-7e then transmits the corresponding driving data to the computer network. In the computer network a histogram is created by special applications, which histogram comprises the speed on the same section of the route in a comparable driving situation.

Figure 8A:
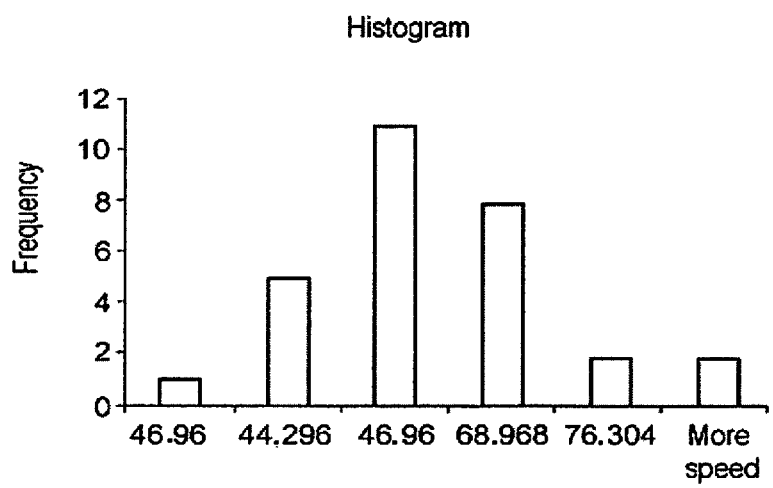
FIGS. 8a-8b show a further histogram and a diagram according to a disclosed embodiment.

An example for such a histogram is shown in FIG. 8a. For comparison the following driving data are taken into account here: temporal proximity, motorization kW/kg, rain/no rain, weekday/Sunday, following travel/free travel.

In the computer network such as the computer network 301 shown in FIG. 3, it is then calculated, for example, that the first driver has a speed that lies at 42% of the spectrum of the plurality of drivers, i.e., in the lower middle field. In other disclosed embodiments, this calculation can be made in the transportation vehicle.

This result relating personally to the first driver is not stored in the computer network but transmitted exclusively to a driver assistance system of the transportation vehicle of the first driver. Thus, a profiling of the first driver is made. The driving behavior of the first driver was compared with the driving behavior of other drivers without it being necessary to first bring the driving data of the first driver into a "normal form" by subtracting the features of the driving situation. This is because mutually corresponding driving situations are used for the comparison.

Figure 8B:
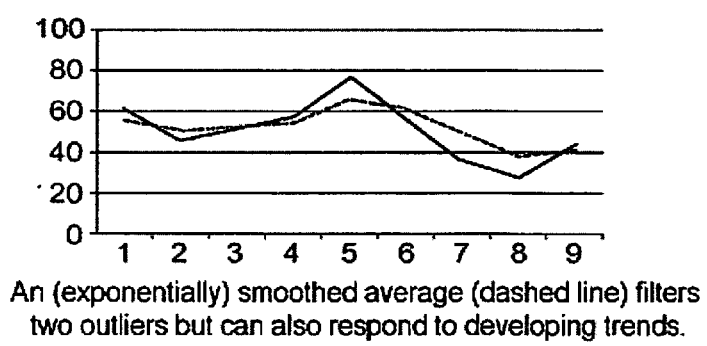

The driver assistance system, e.g., the above ACC or the emergency braking assistant updates with this result a parameter which defines travel round a bend, wherein the value for the parameter for the above example is 45%. This is made according to the principle of the exponentially smoothed average already mentioned above. An example for an exponentially smoothed average is shown in FIG. 8b, wherein the dark-grey line corresponds to the smoothed average and the light-grey line corresponds to the average.

With this described method, trend reversals, e.g., of the speed are imaged appropriately. In addition, the calculation can be implemented efficiently.

In another example, a transportation vehicle approaches the bend and the driver assistance system sends an enquiry to the computer network to obtain the above driving data. In addition to this driving data, the driver assistance system will additionally receive the information that the value for the parameter for this bend is 45%.

The computer network then creates a histogram with the given parameters for the coming bend by the applications in the computer network and calculates how fast the driver is in the region of 45%.

The computer network therefore calculates the speed at 45% of the spectrum which in this case is, e.g., 70 km/h. This result is sent to the driver assistance system of the transportation vehicle whereby the ACC can be automatically set so that the bend is traveled at the 70 km/h comfortable or suitable for the first driver.

Optionally the driver assistance system can display to the first driver that the speed of the ACC in the corresponding bend is reduced if the first driver previously traveled faster.

Another example relates to a dynamic ACC. The first driver travels at a speed of 110 km/h on the road and switches on the ACC manually.

The driver assistance system communicates with the computer network and determines the value 42%, that is the driver here is traveling faster than 42% of all other drivers, this being near-term driving data.

Before the next section of the route, the driver assistance system makes an enquiry about the speed which is faster than 42% of all other drivers. From the computer network the driver assistance system receives the information that the speed is 115 km/h. For the next section of the route the ACC regulates upwards to a speed of 115 km/h.

In another example a very much lower speed is suddenly indicated to the driver assistance system on a section of the route due to roadworks, a cloud burst or as a result of other circumstances. Only relative driving values are stored in the driver profile but the actual speed is oriented on the spectrum of the last speeds traveled on the section.

In heavy traffic the ACC in another example slows down automatically at a specific distance from the preceding transportation vehicle if this is traveling more slowly. In addition no so-called "driving style parameter" is "learnt" here because in heavy traffic the component of situative behavior predominates (i.e., the driver reacts to other transportation vehicles) and the component of independent behavior is very small.

In another example, several route profiles can be anticipated. In this case, the suitable parameters for the driver assistance system and/or the ACC are calculated for all possible following sections of the route in a specific vicinity.

Figure 9:
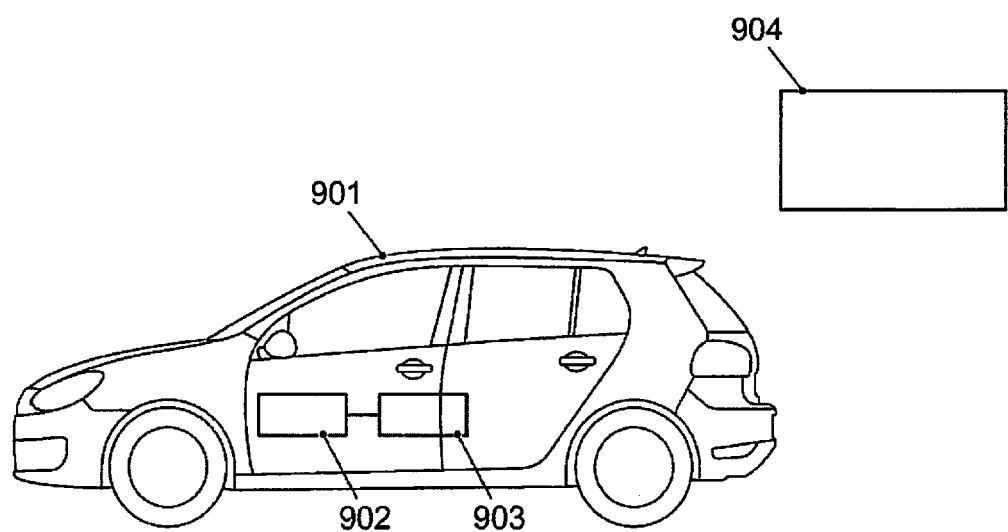
FIG. 9 shows a transportation vehicle according to a disclosed embodiment.

The above-described methods and control devices can be implemented, for example, in a transportation vehicle. This is shown in FIG. 9. FIG. 9 shows a control device 902 which can be integrated in a transportation vehicle 901. The control device can in this case, for example, be a driver assistance system or an ACC as already discussed above or can actuate these. The above-described methods can be implemented in the control device.

The first and second information discussed in connection with FIG. 2 can in this case, as shown in FIG. 9, be sent to an external processing device 904 and/or received by the external processing device 904.

The system shown in FIG. 9 can be used in all suitably equipped transportation vehicles, e.g., having a transportation vehicle computer, driver assistance and navigation systems and an online connection.

REFERENCE LIST

101 Parametrization of driver assistance system
102 Driver profile
103 Action space or situation
104 Observed driver data
200 Method
201-205 Process operations
301 Computer network
302 Transportation vehicle
303 Route
401 Route
402 Transportation vehicle 1
403 Transportation vehicle 2
901 Transportation vehicle
902 Control device
903 Driver assistance system
904 External processing device

The invention claimed is:

1. A method for controlling at least one driver assistance system in a transportation vehicle, the method comprising:
   determining a driving behavior of a driver;
   providing a driving behavior of a plurality of other drivers;
   evaluating the driving behavior of the driver for at least one specific driving situation by comparing the driving behavior of the driver in the at least one specific driving situation with a previous driving behavior of each of the plurality of other drivers in the at least one specific driving situation; and
   actuating the at least one driver assistance system in the transportation vehicle based on the evaluation,
   wherein the driving behavior indicates vehicle parameters controlled by the driver and/or the plurality of other drivers in at least one driving condition,
   wherein the driving behavior of the plurality of other drivers is evaluated within a predefined time window defined according to an initial time of the driving behavior of the driver, and
   wherein the predefined time window is defined by a predetermined amount of time before the initial time of the driving behavior of the driver.

2. The method of claim 1, further comprising:
   transmitting first information of the driving behavior of the driver to an external processing device and/or to at least one further transportation vehicle, and/or
   providing the driving behavior of the plurality of other drivers by receiving second information of the driving behavior of the plurality of other drivers from the external processing device and/or from at least one further transportation vehicle.

3. The method of claim 1, wherein the evaluation of the driving behavior of the driver is made by an external processing device, which additionally calculates parameters for actuating the at least one driver assistance system in the transportation vehicle utilizing the evaluation.

4. The method of claim 1, wherein the determination of the driving behavior of a driver and/or the providing of the driving behavior of the plurality of drivers is made for sections of a route.

5. The method of claim 4, further comprising providing third information which comprises information independent of a driving behavior,
- wherein the third information is information of the sections of the route,
- wherein the third information is utilized in the evaluation, and
- wherein the third information is evaluated within the predefined time window.

6. The method of claim 5, wherein the third information is sent to an external processing device and/or is received by the external processing device.

7. The method of claim 1, wherein the evaluation comprises comparing the driving behavior of the driver with the driving behavior of the plurality of other drivers during a first travel through a section of a route, and wherein the method further comprises creating a driver-specific profile based on the comparison.

8. The method of claim 7, wherein the driver-specific profile comprises a rank of a driver datum in a histogram of comparative data of each of the plurality of other drivers as percentage information and is utilized actuate the at least one driver assistance system in the transportation vehicle, or
- wherein the driver-specific profile comprises a ratio of a driver datum of the driver to an average or a standard deviation of a distribution of the driver data of each of the plurality of other drivers and is utilized actuate the at least one driver assistance system in the transportation vehicle.

9. The method of claim 7, further comprising recording a first change in the driver-specific profile during each further travel through the section of the route, wherein the at least one driver assistance system of the transportation vehicle are actuated during each further renewed travel through the section of the route depending on the recording.

10. The method of claim 9, further comprising estimating a second change in the driver-specific profile for a further not yet travelled section of the route depending on a statistical model and actuating the at least one driver assistance system utilizing the estimate.

11. The method of claim 10, wherein the statistical model utilizes the driver-specific profile of a previously travelled section of the route.

12. An apparatus for controlling functions in a transportation vehicle, the apparatus comprising:
- a control device to determine a driving behavior of a driver, wherein the control device evaluates the driving behavior of the driver for at least one specific driving situation by comparing the driving behavior of the driver in the at least one specific driving situation with a previous driving behavior of the other drivers in the at least one specific driving situation,
- wherein the control device includes driver assistance systems and is configured to actuate the driver assistance systems in the transportation vehicle based on the evaluation, and
- wherein the driving behavior indicates vehicle parameters controlled by the driver and/or the plurality of other drivers in at least one driving condition,
- wherein the driving behavior of the plurality of other drivers is evaluated within a predefined time window defined according to an initial time of the driving behavior of the driver, and
- wherein the predefined time window is defined by a predetermined amount of time before the initial time of the driving behavior of the driver.

13. The apparatus of claim 12, wherein the control device further includes an adaptive speed regulation.

* * * * *